United States Patent
Cowelchuk et al.

(10) Patent No.: US 7,160,404 B2
(45) Date of Patent: Jan. 9, 2007

(54) METHOD OF MANUFACTURING AN AIRBAG ASSEMBLY AND VEHICLE TRIM COMPONENT

(75) Inventors: Glenn A. Cowelchuk, Chesterfield Township, MI (US); Michael J. Hier, Milford, MI (US)

(73) Assignee: Lear Corporation, Southfield, MI (US)

( * ) Notice: Subject to any disclaimer, the term of this patent is extended or adjusted under 35 U.S.C. 154(b) by 247 days.

(21) Appl. No.: 10/732,568

(22) Filed: Dec. 10, 2003

(65) Prior Publication Data

US 2005/0127641 A1 Jun. 16, 2005

(51) Int. Cl.
*B32B 37/00* (2006.01)

(52) U.S. Cl. .................. 156/73.1; 156/308.2

(58) Field of Classification Search .......... 156/73.1, 156/73.5, 272.2, 290, 308.2, 308.4, 73.6, 156/580.1, 580.2; 264/442, 443, 445, 68
See application file for complete search history.

(56) References Cited

U.S. PATENT DOCUMENTS

| | | |
|---|---|---|
| 4,714,575 A | 12/1987 | Preston |
| 5,225,214 A | 7/1993 | Filion |
| 5,304,273 A | 4/1994 | Kenrick et al. |
| 5,316,715 A | 5/1994 | Gray |
| 5,346,249 A | 9/1994 | Hallard et al. |
| 5,348,339 A | 9/1994 | Turner |
| 5,393,089 A | 2/1995 | Pakulsky et al. |
| 5,427,408 A | 6/1995 | Ando et al. |
| 5,456,490 A | 10/1995 | Carter et al. |
| 5,501,890 A | 3/1996 | Mills |
| 5,564,731 A | 10/1996 | Gallagher et al. |
| 5,590,901 A | 1/1997 | MacGregor |
| 5,611,564 A | 3/1997 | Bauer |
| 5,622,402 A | 4/1997 | Pritchard et al. |
| 5,639,115 A | 6/1997 | Kelley et al. |
| 5,685,930 A * | 11/1997 | Gallagher et al. ......... 156/73.1 |
| 5,738,367 A | 4/1998 | Zichichi et al. |
| 5,744,776 A | 4/1998 | Bauer |
| 5,794,967 A | 8/1998 | Manire |
| 5,803,487 A | 9/1998 | Kikuchi et al. |
| 5,975,562 A | 11/1999 | Yamamoto et al. |
| 5,975,563 A | 11/1999 | Gallagher et al. |
| 5,979,931 A | 11/1999 | Totani et al. |
| 5,997,030 A | 12/1999 | Hannert et al. |
| 6,042,139 A | 3/2000 | Knox |
| 6,070,901 A | 6/2000 | Hazell et al. |

(Continued)

*Primary Examiner*—James Sells
(74) *Attorney, Agent, or Firm*—MacMillan, Sobanski & Todd, LLC

(57) ABSTRACT

A method of forming an airbag assembly for a vehicle including the steps of providing a sheet of hinge material, where the hinge material includes a sheet of scrim material encapsulated within a polymer. Next, a panel is provided that is formed of a substrate material. An under face of the panel may have a tear seam to allow an airbag to exit the panel body when the airbag is deployed, and the tear seam may define an airbag door. Next, a first portion of the sheet of hinge material is secured to the panel within the airbag door defined by the tear seam. Securing the hinge material to the panel may occur by vibration welding a portion of the hinge material to the panel. A second portion of the sheet of hinge material is secured to the airbag housing and an airbag housing is secured to the panel. The hinge material may be secured to the airbag housing such that a third portion of the sheet of hinge material forms a loop.

16 Claims, 3 Drawing Sheets

U.S. PATENT DOCUMENTS

| | | |
|---|---|---|
| 6,076,851 A | 6/2000 | Davis, Jr. et al. |
| 6,089,642 A | 7/2000 | Davis, Jr. et al. |
| 6,092,835 A | 7/2000 | Thakore et al. |
| 6,093,272 A | 7/2000 | Visconti et al. |
| 6,095,272 A | 8/2000 | Takiguchi et al. |
| 6,145,871 A | 11/2000 | Davis, Jr. et al. |
| 6,210,614 B1 | 4/2001 | Gardner et al. |
| 6,217,098 B1 | 4/2001 | O'Brien et al. |
| 6,250,669 B1 | 6/2001 | Ohmiya |
| 6,440,514 B1 | 8/2002 | Ueno et al. |
| 6,460,880 B1 | 10/2002 | Gallagher et al. |
| 6,533,312 B1 | 3/2003 | Labrie et al. |
| 6,644,685 B1 | 11/2003 | Sun et al. |
| 6,742,804 B1 | 6/2004 | Suzuki et al. |
| 6,753,057 B1 | 6/2004 | Gardner |
| 2002/0043788 A1 | 4/2002 | Gallagher et al. |
| 2002/0079675 A1 | 6/2002 | Taoka et al. |
| 2002/0153741 A1 | 10/2002 | Speelman et al. |
| 2003/0020263 A1 | 1/2003 | Preisler |
| 2004/0026902 A1 | 2/2004 | Yasuda et al. |

\* cited by examiner

METHOD OF MANUFACTURING AN AIRBAG ASSEMBLY AND VEHICLE TRIM COMPONENT

BACKGROUND OF THE INVENTION

This invention relates in general to vehicle trim components, and in particular relates to a method of manufacturing an airbag assembly and trim component.

The interior of a vehicle typically includes a multitude of components for covering various frameworks, instruments, and electrical devices mounted within the interior compartment of a vehicle. Examples of trim components include instrument panels, door panels, center consoles, overhead consoles, and other various interior panels for covering the sides, ceilings, and vertical pillars of the frame members of the vehicle.

The instrument panel is generally positioned underneath the windshield and attached to the frame of the vehicle behind the engine compartment. The instrument panel encloses various vehicle components, such as electrical and ventilation systems, audio systems, vehicle instrument gauges and displays, airbag assemblies, and auxiliary compartments.

In the past, trim components, such as instrument panels, were made of metal or plastic and commonly had rigid exterior upper and rear surfaces facing the interior of the vehicle. The upper and rear surfaces of the instrument panel are within reach and direct sight of the occupants of the vehicle. Recently, consumers have been demanding a more aesthetically pleasing exposed surface. It is also preferred that the tactile properties of the surfaces are also more pleasing, such as having soft or elastic properties compared to a relatively rigid surface. Thus, the outer surface areas of the trim components have been covered in a suitably soft material over the rigid structurally accommodating framework of the trim component.

In certain instances, the occupants of a vehicle may come into physical contact with portions of the trim components. During a vehicle impact condition, sudden large impact forces may be delivered to the occupant of the vehicle, such as in a rearward, frontal, or side impact. These forces may cause the head and limbs of the occupant to be forced against trim components and structures of the vehicle, thereby causing injury.

Various countermeasures have been taken to help reduce the degree of injury caused by impact conditions. For example, passive restraint systems having airbags and/or air curtains have been implemented into vehicles. Generally, such airbag assemblies are stored and packaged in deflated condition in storage areas within the passenger compartment of the motor vehicle. The airbag assemblies include sensors located at various points in the vehicle. Upon impact, the sensors are triggered thereby sending a signal to a gas generator or igniter. The gas generator operates to inflate the airbag when it receives a signal from the sensors. The airbags are located at various areas within the interior of the vehicle in which contact with the occupant is likely. For example, airbags are positioned in front of the driver and passenger locations, such as in the steering wheel and passenger side of the trim component or instrument panel. Air curtains may additionally or alternatively be included in such airbag assemblies, and may be positioned along the sides of the occupants, such as mounted at the edges of the headliner and propelled downwardly when inflated. Side air curtains have also been incorporated into the side portions of the seat backs.

When incorporating an airbag assembly into a trim component such as an instrument panel, the trim component includes an opening through which the airbag deploys when activated. It is generally desirable to include a mountable door or cover on the trim component to conceal the opening in the trim component. It is becoming increasingly common to provide a seamless or hidden airbag cover portion in the instrument panel that will reliably and safely tear upon deployment of the airbag, such that the passenger is protected. To this end, a tear seam has generally been provided in the airbag cover portion of an instrument panel to insure that the airbag will safely deploy.

Vehicle designers prefer to have a continuous surface on the front face of the trim component, whenever possible, so they would prefer to avoid having a part line or seam in the trim component. Thus, for trim components such as instrument panels, recently there has been an effort to achieve a "seamless" design wherein there is no indication on the front face of the instrument panel that the airbag is behind the instrument panel. To achieve this design, hidden tear seams or tear strips provided in the instrument panel are only provided on the under face, and not on the front face of the instrument panel.

The trim component should perform the utilitarian function of breaking apart along its tear seam to allow the airbag to exit through the airbag cover portion of the trim component when deployed. Preferably, the airbag cover portion of the trim component should not break apart, especially during cold deployment.

Thus, it is desirable to provide an improved method of manufacturing a trim component and airbag assembly in a "seamless" design that will deploy without undesirable failures, such as during cold deployment. It is also desirable to provide an improved method of manufacturing a trim component and airbag assembly that is cost effective and simplifies the manufacturing process.

In a known method of manufacturing an airbag assembly, a scrim material is used as a hinge to attach an airbag cover to the vehicle. A first end portion of the scrim material is coated in a plastic material. A second end portion of the scrim material is also coated in the plastic material. The first end portion of the scrim material is attached to the vehicle by a fastener disposed through the scrim and plastic material. Next, the second end portion of the scrim material is vibration welded to the instrument panel. An intermediate portion of the scrim material is disposed between the first and second portions. The intermediate portion is not coated in plastic material. The uncoated intermediate portion of the hinge material acts as a flexible hinge between the vehicle and the airbag cover. Although this method has worked successfully, the manufacture of this hinge is expensive and time intensive, because of the numerous steps required to coat only the first and second end portions of the scrim to produce the hinge.

BRIEF SUMMARY OF THE INVENTION

This invention relates to a method of forming an airbag assembly for a vehicle. The method includes providing a sheet of hinge material, where the hinge material includes a sheet of scrim material encapsulated within a polymer. Next, a panel is provided that is formed of a substrate material. The panel has a front face and an under face. The under face has a tear seam to allow an airbag to exit the panel body when the airbag is deployed. The tear seam defines an airbag door. Next, a first portion of the sheet of hinge material is secured to the panel within the airbag door defined by the tear seam.

Securing the hinge material to the panel may occur by welding a portion of the hinge material to the panel. The hinge material may be subjected to vibratory motion during the welding process. An airbag housing having an airbag disposed therein is then provided. Finally, a second portion of the sheet of hinge material is secured to the airbag housing, a chute, or other portion of the vehicle, and the airbag housing is also secured to the panel. The hinge material may be secured to the airbag housing such that an intermediate portion of the sheet of hinge material is disposed between the first portion and the second portion such that the intermediate portion is not attached to the panel, the airbag collar, or the airbag housing. The intermediate portion acts as a flexible hinge to allow the airbag door to be retained yet allowed to move free of the airbag when the airbag is deployed.

Various objects and advantages of this invention will become apparent to those skilled in the art from the following detailed description of the preferred embodiment, when read in light of the accompanying drawings.

DETAILED DESCRIPTION OF THE INVENTION

Figure 1:
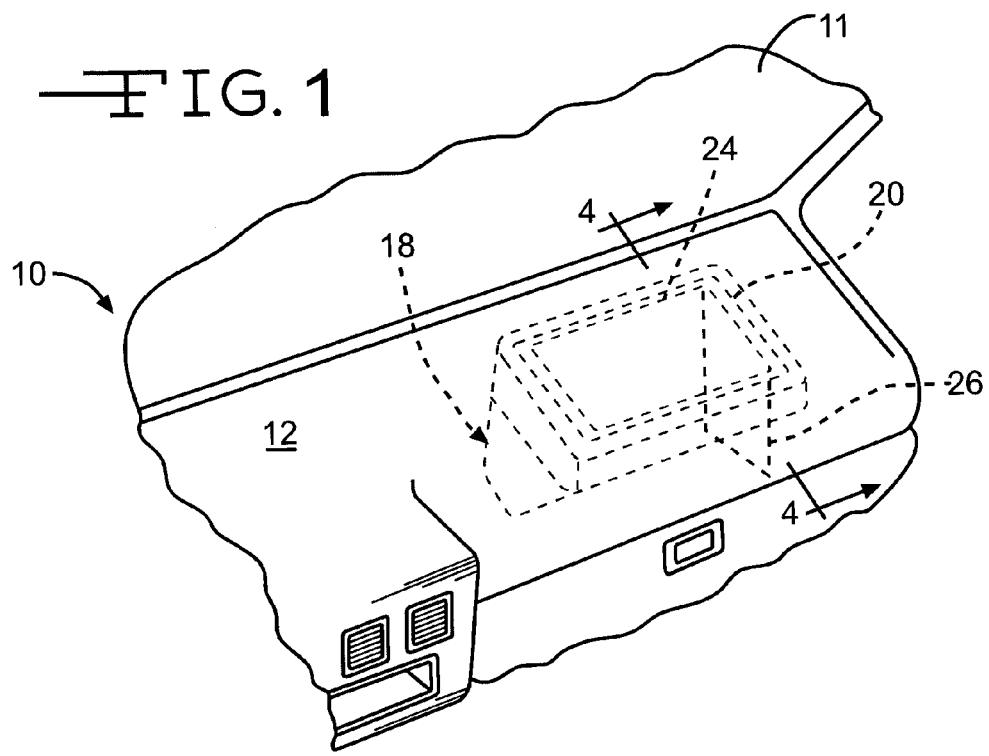
FIG. 1 is a schematic perspective view of an instrument panel and airbag assembly manufactured in accordance with the method of the present invention.

Referring now to the drawings, there is illustrated in FIG. 1, an instrument panel, indicated generally at 10. It should be understood that while the method of manufacturing a trim component in accordance with the present invention will be described and shown in FIGS. 1 through 9 with respect to the instrument panel 10, the method may be practiced to form any type of trim component or portions of trim components for a vehicle. Other suitable examples of trim components which can be formed from the present invention include door panels, center consoles, overhead consoles, and other various interior panels for covering the sides, ceilings, and/or vertical pillars of the frame members of the vehicle.

The instrument panel 10 is preferably installed on a vehicle frame (not shown) generally in the area underneath a windshield 11 and between the engine compartment and the interior of the vehicle. The instrument panel 10 can include any suitable frame structure (not shown) for supporting the instrument panel 10 on the vehicle frame. The portion of the instrument panel 10 illustrated in FIG. 1 preferably defines the upper portion and a section of the rear portion of the instrument panel facing the interior of the vehicle. Since the upper and rear portion of the instrument are within reach and direct sight of the occupants of the vehicle, it is desirable for this portion of the instrument panel to be aesthetically pleasing in color and texture as well as having a desirable tactile feel, such as a soft or slightly elastic feel.

The instrument panel 10 generally includes a substrate 12. An aesthetically pleasing outer layer (not shown) may be provided that generally covers the upper portion and a section of the rear portion of the substrate 12 such that the outer layer is visible to passengers of the vehicle. The substrate 12 of the instrument panel 10 can be molded in accordance with the present invention with materials molded at various areas to form various features such as outer layers, seals, pads, gap hiding strips, membranes, living hinges, trays, storage compartment liners, and membrane speakers.

The substrate 12 is preferably made of a relatively rigid material so as to provide support for any additional features and to retain the shape of the instrument panel 10, and more preferably is made of a polymer or plastic material. Although additional members or framework may be attached to the substrate 12 for supporting the instrument panel 10 onto the frame of the vehicle, preferably the substrate 12 is rigid enough to structurally support itself. Examples of suitable materials for the substrate 12 include thermoplastic elastomer, thermoplastic elastomer olefin, thermoplastic elastomer polyolefin, Santoprene®, styrene maleic anhydride, Dylark®, polycarbonate, polypropylene, acrylonitrile butadiene styrene (ABS), polycarbonate acrylonitrile butadiene styrene, styrene maleic anhydride (SMA), polyphenylene oxide (PPO), nylon, polyester, acrylic, polysulfone, thermoplastic polyether, thermoplastic urethane, polypropylene, polyurethane, copolyester, thermoplastic styrenic elastomer, nylon, and any combination thereof. The substrate 12 can also have any suitable textured surface and color.

Various covers and panels may be attached to the substrate 12 to cover exposed positions thereof. For example, an aesthetically pleasing trim panel, such as a faux wood or carbon fiber panel (not shown) may be used to cover a portion of the substrate 12. Other components, such as vent covers, display devices, electronic controls, audio/video entertainment units, and the like may be attached to the substrate 12 and covering at least a portion of the substrate 12. Alternatively, all of the exposed portions of the instrument panel 10 may be covered and not seen from within the interior of the vehicle.

The substrate 12 can be formed of a single part or can be formed from attaching separate relatively rigid sections, thereby forming the substrate 12 as shown in FIG. 1. It should also be understood that portions of the substrate 12 can be partially or totally covered in separate trim panels. Also, portions of the substrate 12 may be covered by housings of various vehicle components mounted thereon or within the apertures formed in the substrate 12.

Figure 4:
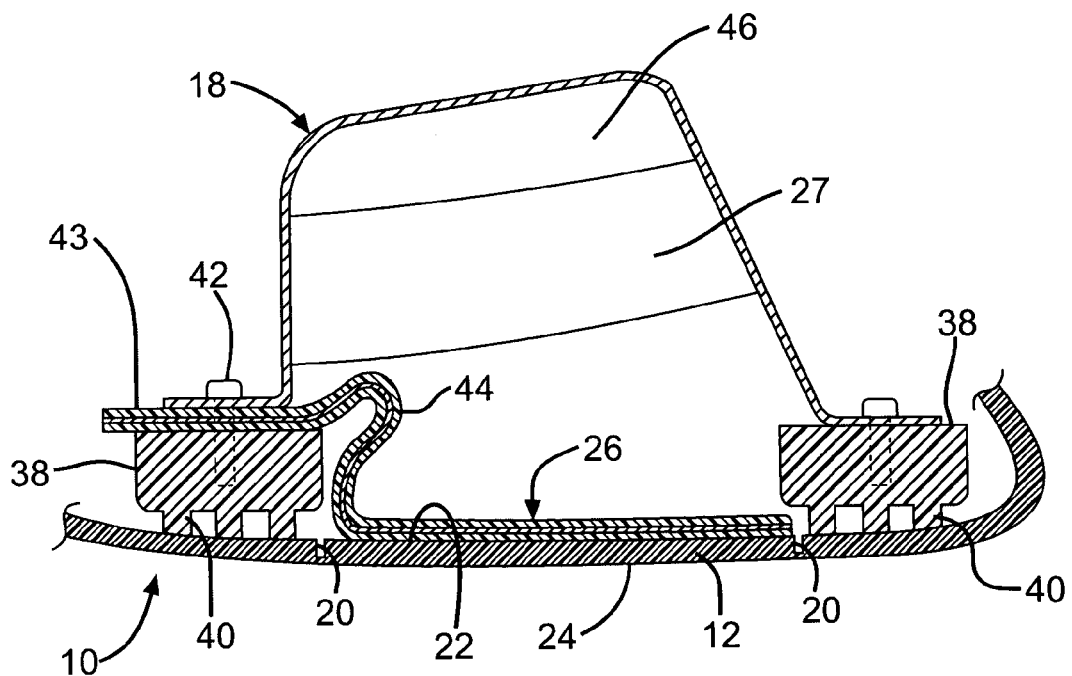
FIG. 4 is a cross-sectional view of the instrument panel and airbag assembly of FIG. 1 taken along lines 4—4 in FIG. 1

Shown schematically in phantom outline in FIG. 1 is an airbag module 18 located behind the substrate 12. As shown in FIGS. 1 and 4, a tear seam 20 is formed in an under face 22 of the substrate 12. Preferably, the tear seam 20 defines an airbag door 24. It will be appreciated that the tear seam 20 can be any weakened area of the substrate 12, such that an airbag 27, as shown schematically in FIG. 4, can exit the instrument panel 10 when the airbag 27 is deployed, for example, during a vehicle collision. The airbag door 24 is attached to the vehicle by a hinge 26. The hinge 26 allows the airbag 27 to force the airbag door 24 free from the instrument panel 10, while retaining the airbag door 24 such that the airbag door 24 does not freely enter the interior cabin of the vehicle.

As shown in FIG. 1, the tear seam 20 may have a substantially rectangular shape. However, it will be appreciated that the tear seam 20 can be of any desired shape, such as U-shaped, or H-shaped to permit the deployment of the airbag 27. The tear seam 20 can be formed by any desired method. Preferably, the tear seam 20 is formed by laser scoring, as will be described below. As will be described below, the hinge 26 may be vibration welded to the substrate 12 of the instrument panel 10 by the method of this invention. Preferably, the hinge 26 is welded to the substrate 12 within the airbag door 24 defined by the tear seam 20.

The hinge 26 is preferably made of a material having a tensile strength that will allow the hinge 26 to restrain the airbag door 24 during a deployment and is strong enough to withstand a vibration welding operation to attach the hinge 26 to the instrument panel 10. In a preferred embodiment, the hinge 26 is made of a thermoplastic elastomer, such as Santoprene® with a nylon or polyester scrim and has a durometer of less than about 85 Shore A. In a more preferred embodiment, the hinge 26 has a durometer of about 65 Shore A. The hinge 26 comprises a layer of scrim 28 that is preferably completely encapsulated within a polymer 30, such that preferably neither of the major surfaces of the scrim 28 are exposed. Examples of suitable materials for the scrim 28 include lightweight polymers or plastics, such as polyethylene terephthalate (PET), nylon, polyester or blends thereof. The scrim material 28 may be woven, non-woven, or film backing or barrier. Examples of suitable materials for the polymer 30 of the hinge 26 include thermoplastic elastomer, thermoplastic elastomer olefin, thermoplastic elastomer polyolefin, Santoprene®, styrene maleic anhydride, Dylar®, polycarbonate, polypropylene, acrylonitrile butadiene styrene (ABS), polycarbonate acrylonitrile butadiene styrene, styrene maleic anhydride (SMA), polyphenylene oxide (PPO), nylon, polyester, acrylic, polysulfone, thermoplastic polyether, thermoplastic urethane, polypropylene, polyurethane, copolyester, thermoplastic styrenic elastomer, nylon, and any combination thereof. It will be appreciated that the scrim 28 and the polymer 30 of the hinge 26 may be formed of any materials that are capable when formed into the hinge 26 of performing during welding and flexing operations as described herein. It will be appreciated that the material of the substrate 12 and the polymer 30 may be the same materials or different materials with melt temperature and melt flow indexes that are compatible to facilitate plastic welding with one another, as will be described herein.

Figure 2:
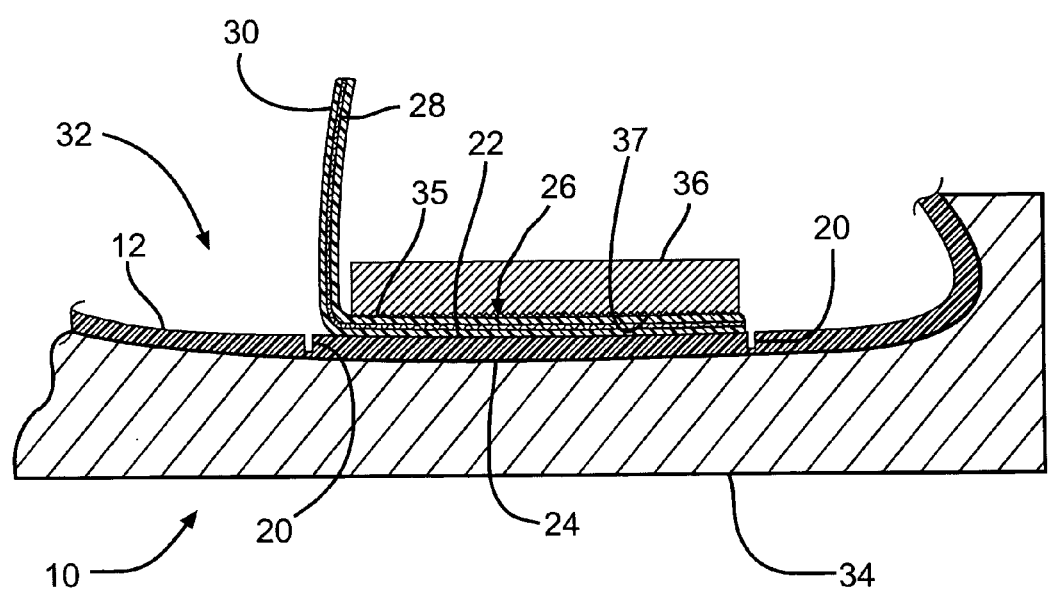
FIG. 2 is a cross-sectional view of a portion of the instrument panel of FIG. 1 and a welding apparatus illustrating a preferred method of manufacturing the instrument panel of FIG. 1.
Figure 3:
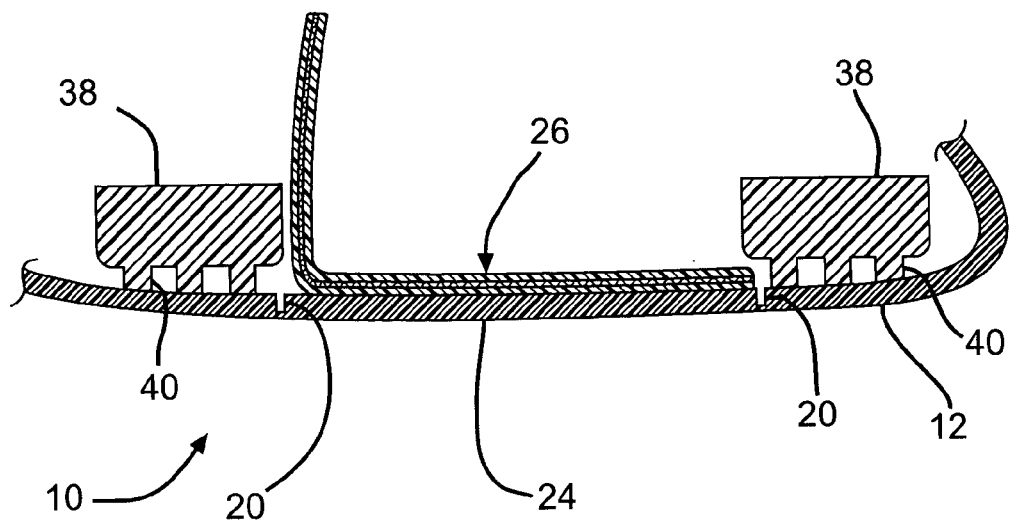
FIG. 3 is a cross-sectional view of a portion of the instrument panel and a portion of the airbag assembly of FIG. 1, illustrating another step of the preferred method of manufacturing the instrument panel and airbag assembly of FIG. 1.

The instrument panel 10 is preferably manufactured by the method of the present invention, as schematically illustrated in FIGS. 2 through 4. As shown in FIG. 2, the hinge 26 has been molded so that the hinge 26 comprises a layer of scrim 28 encapsulated within a polymer 30. The layer of scrim 28 is preferably disposed is within the polymer 30, such that neither of the major surfaces of the scrim 28 are substantially exposed. It will be appreciated that the scrim 28 may not be encapsulated within the polymer 30 at or along the edges of the hinge 26. The manufacture of the hinge 26 will be described in more detail below. The substrate 12 and hinge 26 are positioned within a vibration welding machine 32 to be vibration welded to one another. The substrate 12 is placed on an anvil 34 of the vibration welding machine 32 to support the instrument panel 10 during the welding operation. The substrate 12 is positioned against the anvil 34 such that the under face 22 of the substrate 12 faces away from the anvil 34. A first portion 35 of the hinge 26 is positioned against the under face 22 of the substrate 12 of the instrument panel 10 opposite the anvil 34. A horn 36 of the vibration welding machine 32 is preferably positioned adjacent the hinge 26 opposite the portion of the hinge 26 that is adjacent the substrate 12. Thus, the horn 36 and the anvil 34 surround the portion of the substrate 12 and the first portion 35 of the hinge 26 to be vibration welded to one another. The horn 36 engages the polymer 30 of the hinge 26 and moves the hinge 26. Meanwhile, the substrate 12 is held in position by the anvil 34. The relative motion between the hinge 26 and the substrate 12 as the hinge 26 and substrate 12 are held in pressing engagement with one another creates enough heat to melt the polymer 30 to the substrate 12. Thus, when molten polymer 30 and/or the substrate 12 are cooled, the hinge 26 is vibration welded to the substrate 12. It will be appreciated that although the welding of the hinge 26 to the substrate 12 has been described above as vibration welding, other welding techniques such as orbital, frictional, ultrasonic, hot plate, or heat stake welding may be used to attached the hinge 26 to the substrate 12. It will further be appreciated that at least one of the substrate 12 and the hinge 26 may be provided with weld beads (not shown) to facilitate the welding of the hinge 26 to the substrate 12, as is conventional in the welding art.

During the welding process described above, the horn 36 engages the hinge 26 and a plurality of teeth 37 attached to the horn 36 contact the hinge 26. The major surfaces of the scrim 28 of the hinge 26 are substantially covered by the polymer 30, such that the teeth 37 of the horn 36 do not undesirably damage the scrim 28 when the hinge 26 is subjected to vibration welding. Preferably, the teeth 37 grip the polymer 30 during the vibration welding of the hinge 26, so that the teeth 37 have minimal direct contact with the scrim 28. Thus, the hinge 26 is capable of withstanding the force applied to the hinge 26 by the teeth 37 as vibratory movement is induced in the hinge 26 by the horn 36 during the plastic welding process. In a preferred embodiment, the hinge 26 is formed such that the thickness of the hinge 26 is about 1.5 millimeters, such that the scrim 28 is embedded substantially within the center of the thickness of the hinge 26, although such is not required.

As is also shown in FIG. 2, the tear seam 20 has been formed, preferably by laser scoring, in the under face 22 of the instrument panel 10. It will be appreciated that the tear seam 20 may be formed at any step of the manufacture of the instrument panel 10 as described herein. The tear seam 20 defines the airbag door 24, and, preferably, the portion of the substrate 12 to be vibration welded the substrate 12 is within the tear seam 20, such that the first portion 35 of the hinge 26 is secured to the airbag door 24.

In FIG. 3, the instrument panel 10 and hinge 26 have been removed from the vibration welding machine 32. An airbag collar 38 may be secured to the substrate 12 by any suitable method, such as vibration welding. Preferably, the airbag collar 38 surrounds the airbag door 24, although such is not required. It will be appreciated that the airbag collar 38 may extend around only a portion or around multiple portions of the airbag door 24. The airbag collar 38 may include weld beads 40 to facilitate securing the airbag collar 38 to the substrate 12, although such is not required Next, the airbag module 18 may be then secured to the collar 38 by any suitable method, such as by bolts 42, as shown in FIG. 4. A second portion 43 of the hinge 26 may also be secured to the collar 38 by the bolts 42, or by any other suitable attachment means. The bolts 42 or other attachment means may be inserted through the hinge 26, or, if desired, the hinge 26 may include an aperture (not shown) formed therethrough to facilitate the attachment of the hinge 26 to the collar 38 or other portion of the vehicle. It will be appreciated that the second portion 43 of the hinge 26 may be attached to the vehicle and/or the collar 38 by any known fastening means, such that the airbag door 24 is attached to the vehicle by the hinge 26. Thus, the hinge 26 allows the airbag 27 to force the airbag door 24 free from the instrument panel 10, yet retains the airbag door 24 such that the airbag door 24 does not freely enter the interior cabin of the vehicle.

The second portion 43 of the hinge 26 may be secured to the collar 38 such that the hinge 26 includes a loop portion 44 disposed between the first portion 35 of the hinge 26 secured to the airbag door 24 and the second portion of the hinge 26 secured to the collar 38. The loop portion 44 provides slack to allow the airbag door 24 to extend further away from the airbag module 18, such that the airbag door 24 is clear of the airbag 27 as the airbag 27 deploys. Thus, the loop portion 44 of the hinge 26 allows the airbag door 24 to move free of the path of the airbag 27 during deployment. The loop portion 44 of the hinge 26 must be flexible, even in extreme temperatures as low as about −40° Fahrenheit, such that the airbag door 24 does not interfere with the airbag 27 as the airbag 27 deploys. The loop portion 44 of the hinge 26 is formed of the same material as the first portion 35 of the hinge 26. Thus, the hinge 26 must be formed of a material that is able to withstand a welding operation and remain flexible during airbag deployment, as described herein.

The airbag module 18 preferably includes the airbag 27 and an airbag inflator 46. Any conventional airbag inflator 46 may be used for deployment of the airbag 27. The airbag inflator 46 and the airbag 27 are shown schematically for illustration purposes since they are known in the art and their construction forms no part of the invention. As will be understood by one of ordinary skill in the art, the shape of the airbag module 18, airbag inflator 46, and airbag 27 may vary from that shown.

Figure 5:
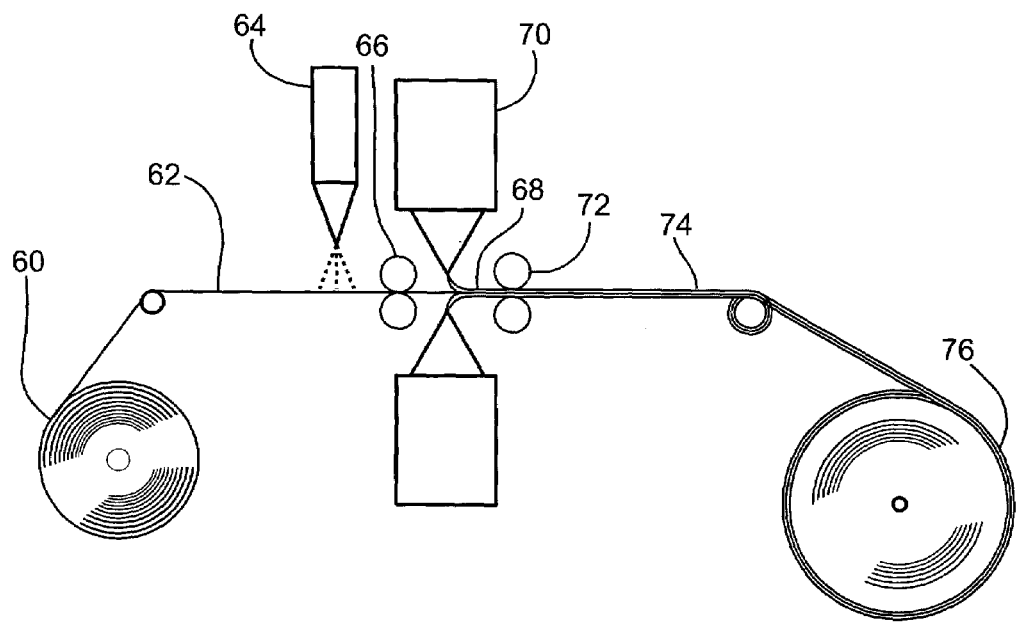
FIG. 5 is a schematic representation of a manufacturing assembly for producing a polymer encapsulated scrim mat for use in the airbag assembly of FIG. 1.

An embodiment of the manufacture of the scrim material 28 will now be described. As shown in FIG. 5, a roll of scrim 60 is unrolled onto a conveyor assembly 62. An adhesive promoter and/or accelerant may be sprayed onto at least one side of the scrim 60 from a sprayer 64, although such is not required. The scrim 60 enters an alignment roller assembly 66. Next, a polymer 68 is applied to the scrim 60 from a reservoir 70. The scrim 60 and polymer 68 enter a hot roller assembly 72 in which the polymer is molded to the scrim 60 to form a scrim mat 74. In a preferred embodiment, the polymer 68 is molded such that scrim 60 is encapsulated within the polymer 68. In a more preferred embodiment, the polymer 68 is molded such that the scrim 60 is completely encapsulated within the polymer 68, such that neither of the major surfaces of the scrim are exposed. Finally, the scrim mat 74 exits the conveyor assembly 62 and is rolled into a scrim mat roll 76.

Although the scrim mat 74 has been described as being manufactured using a molding process, it will be appreciated that the scrim mat 74 may be manufactured by any suitable process, for example, an extrusion process, such as double extruding, or any molding process, such as insert molding.

The scrim mat roll 76 may be sized to be larger than required to produce the hinge 26. The scrim mat roll 76 is sized such that the scrim mat roll 76 is suitable for shipment. Preferably, the scrim mat roll 76 is then cut into the desired size necessary to form hinges, such as the hinge 26, as will be described below.

Figure 6:
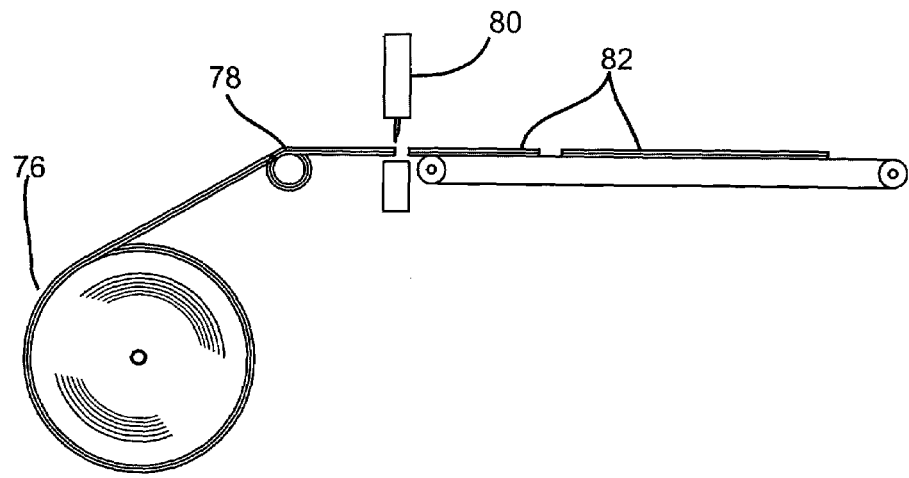
FIG. 6 is a schematic representation of a manufacturing assembly for producing a portion of the airbag assembly of FIG. 1.

As shown in FIG. 6, a scrim mat roll 76 is unrolled onto a conveyor assembly 78. The scrim mat roll 76 is placed in a cutter 80 and the scrim mat roll 76 is cut to form a plurality of hinges 82. Each of the hinges 82 are suitable for use in accordance with the invention as described herein for the hinge 26. Thus, each of the hinges 82 are formed of a scrim 60 encapsulated in polymer 68. The major surfaces of the hinges 82 are primarily covered by the polymer 68, such that the hinges 82 have characteristics suitable to facilitate plastic welding of a portion of each of the hinges 82 to an instrument panel, as described herein. Additionally, the polymer 68 has characteristics suitable for operation as the hinge 26 as described above. The polymer 68 and scrim 60 allows the airbag door 24 to be retained, yet are preferably flexible even in temperatures as low as about −40° Fahrenheit, such that the airbag 27 deploys successfully.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of forming an airbag assembly for a vehicle comprising:
   a. providing a sheet of hinge material having a sheet of scrim material encapsulated within a polymer, such that the major surfaces of the scrim are substantially covered by the polymer;
   b. providing a panel formed of a substrate material, the panel having a front face and an under face, the under face having a tear seam to allow an airbag to exit the panel body when the airbag is deployed, the tear seam defining an airbag door;
   c. securing a first portion of the sheet of hinge material to the airbag door by welding a portion of the hinge material to the panel wherein the hinge material is subjected to vibratory motion during the welding process;
   d. providing an airbag housing having an airbag disposed therein; and
   e. securing a second portion of the sheet of hinge material relative to the airbag housing, such that an intermediate portion of the sheet of hinge material is disposed between the first portion and the second portion acts as a flexible hinge to allow the airbag door to be retained relative to the panel yet allowed to move free of the airbag when the airbag is deployed.

2. The method of claim 1, wherein the second portion of the sheet of hinge material is secured to the airbag housing, such that the intermediate portion of the sheet of hinge material is not attached to the panel, the airbag collar or the airbag housing.

3. The method of claim 1, wherein the polymer material is different from the material of the panel, the melt temperature and melt flow index of the polymer material and material of the panel being compatible such that the polymer material and material of the panel may be vibration welded to one another.

4. The method of claim 1, wherein the polymer material is made of a material selected from the group consisting of thermoplastic elastomer, thermoplastic elastomer olefin, thermoplastic elastomer polyolefin, thermoplastic vulcanizates, styrene maleic anhydride, thermoplastic resin, polycarbonate, polypropylene, acrylonitrile butadiene styrene, polycarbonate acrylonitrile butadiene styrene, styrene maleic anhydride, polyphenylene oxide, nylon, polyester, acrylic, polysulfone, thermoplastic polyether, thermoplastic urethane, polypropylene, polyurethane, copolyester, thermoplastic styrenic elastomer, and nylon.

5. The method of claim 1, wherein the material of the panel is made of a material selected from the group consisting of thermoplastic elastomer, thermoplastic elastomer olefin, thermoplastic elastomer polyolefin, thermoplastic vulcanizates, styrene maleic anhydride, thermoplastic resin, polycarbonate, polypropylene, acrylonitrile butadiene styrene, polycarbonate acrylonitrile butadiene styrene, styrene maleic anhydride, polyphenylene oxide, nylon, polyester, acrylic, polysulfone, thermoplastic polyether, thermoplastic urethane, polypropylene, polyurethane, copolyester, thermoplastic styrenic elastomer, and nylon.

6. The method of claim 1, wherein the scrim material is made of a material selected from the group consisting of polyethylene terephthalate (PET), nylon, polyester, and blends thereof.

7. The method of claim 1, wherein one of the materials of the scrim and the panel includes an adhesive promoter to form a bond between the scrim and the panel.

8. The method of claim 1, wherein a portion of the airbag assembly forms a portion of an instrument panel.

9. The method of claim 1, wherein steps (d) and (e) are performed subsequently to step (c).

10. The method of claim 1, wherein step (c) is performed subsequently to step (e).

11. The method of claim 1, further including the step of securing the airbag assembly to the panel.

12. The method of claim 1, wherein step (b) further includes providing an airbag collar attached to the panel, such that step (e) further includes securing the second portion of the sheet of hinge material to the airbag collar and securing the airbag housing to the airbag collar.

13. The method of claim 1, wherein the sheet of hinge material has a durometer of less than about 85 Shore A.

14. The method of claim 1, wherein the sheet of hinge material has a durometer of about 65 Shore A.

15. The method of claim 1, wherein the polymer of the sheet of hinge material is comprised of thermoplastic vulcanizates and the sheet of scrim material is comprised of nylon.

16. The method of claim 1, wherein the polymer of the sheet of hinge material is comprised of thermoplastic vulcanizates and the sheet of scrim material is comprised of polyester.

* * * * *